United States Patent [19]

Eisele et al.

[11] 4,105,747

[45] Aug. 8, 1978

[54] METHOD FOR DEHYDRATING METAL CHLORIDES

[75] Inventors: Judith A. Eisele, Verdi; Donald J. Bauer, Reno, both of Nev.

[73] Assignee: The United States of America as represented by the Secretary of the Interior, Washington, D.C.

[21] Appl. No.: 805,378

[22] Filed: Jun. 10, 1977

[51] Int. Cl.$^2$ .......................... C01F 5/34; C01F 7/58; C01F 17/00; C01G 9/04

[52] U.S. Cl. .................... 423/263; 423/491; 423/493; 423/495; 423/498; 423/659; 34/9

[58] Field of Search ............... 423/263, 659, 498, 491, 423/493, 495; 34/9, 95

[56] References Cited

U.S. PATENT DOCUMENTS

| | | | |
|---|---|---|---|
| 1,289,079 | 12/1918 | Balke | 423/263 |
| 3,411,869 | 11/1968 | Bradley et al. | 423/493 |
| 3,812,241 | 5/1974 | Pucolo et al. | 423/659 |
| 3,966,888 | 6/1976 | Braithwaite et al. | 423/498 |

FOREIGN PATENT DOCUMENTS

| | | | |
|---|---|---|---|
| 47-45,677 | 11/1972 | Japan | 423/495 |
| 255,042 | 4/1927 | United Kingdom | 423/498 |

OTHER PUBLICATIONS

Breck, "Zeolite Molecular Sieves," John Wiley & Sons, N.Y., 1974, p. 700.

Sokolov et al., "Molecular Sieves and Their Uses," Joseph Crosfield & Sons, Ltd., Warrington, 1965.

*Primary Examiner*—Herbert T. Carter
*Attorney, Agent, or Firm*—William S. Brown; Donald A. Gardiner

[57] ABSTRACT

A hydrated metal salt is dehydrated to its anhydrous form by dissolving the metal salt hydrate in an organic solvent; and contacting the solvent solution of metal salt hydrate with a molecular sieve of a pore size sufficient to permit the absorption of water molecules but of a size too small to absorb solvent molecules.

1 Claim, No Drawings

METHOD FOR DEHYDRATING METAL CHLORIDES

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

The present invention relates to a method for preparing anhydrous metal salts. More particularly, the invention relates to a method of preparing anhydrous metal salts by using a crystalline aluminosilicate material as a means for absorbing and removing the water of hydration from a hydrated metal salt.

2. Description of the Prior Art

Anhydrous metal salts are conventionally prepared by a variety of techniques. United States Pat. No. 3,799,746 shows a method of forming anhydrous aluminum chloride in which chlorine gas is passed by means of graphite lances into molten aluminum at a temperature of 1300° C to 1500° C. The vaporous, anhydrous aluminum trichloride which is produced by the process is passed via a conduit to a condenser upon which the anhydrous aluminum trichloride condenses.

Various procedures are known for preparing anhydrous magnesium salts which also are involved and complicated procedures. Thus, U.S. Pat. No. 3,440,006 shows a method of preparing anhydrous magnesium halide which is substantially free of magnesium oxide by admixing a saturated solution of a hydrated magnesium halide in absolute alcohol with a cycloaliphatic ether. A metal halide complex forms which contains both alcohol and ether molecules and which is insoluble in the alcohol solvent. After separation, the complex is heated, whereby the organic solvents in the complex are liberated thereby forming a magnesium halide product substantially free of magnesium oxide. United States Pat. No. 3,975,283 discloses a technique of preparing magnesium chloride by adding a gelling agent to a brine solution containing magnesium chloride. The gel is spray dried to prepare the anhydrous magnesium halide product. A relatively complex procedure of preparing anhydrous magnesium chloride is disclosed by U.S. Pat. No. 3,983,224 in which a slurry of $MgCl_2$ is formed in the diethyl ether of tetraethylene glycol and an azeotropic agent which has a boiling point less than the ether. Distillation of the slurry results in the removal of water from the halide salt. However, several other steps are necessary before the desired anhydrous magnesium chloride can be eventually obtained. U.S. Pat. No. 3,341,282 reveals a method of dehydrating carnallite ($KCl.MgCl_2.6H_2O$) to eventually yield anhydrous magnesium chloride. In the process, the ore is roasted at temperatures of preferably about 600° F to remove the water of hydration. The residue is then treated with an alcohol, preferably a $C_3$ to $C_8$ alcohol and is heated to effect solution of the magnesium chloride salt over the alkali metal halide impurities. The alcoholic solution containing dissolved magnesium chloride is then treated with ammonia, thereby forming a complex magnesium salt ammonia precipitate. The precipitate is then heated to remove ammonia and liberate traces of the alcoholic solvent. It is evident from the above discussion that the prior art procedures for preparing anhydrous salts are complicated and most often involve the use of high temperatures and occassionally corrosive atmospheres.

A need, therefore, continues to exist for a simple and effective method of preparing anhydrous metal salts which does not require the use of high temperatures and ocrrosive materials.

SUMMARY OF THE INVENTION

Accordingly, one object of the present invention is to provide a simple and effective method for preparing anhydrous metal salts, particularly those types which are difficult to dehydrate without decomposing the salt.

Another object of the invention in particular is to provide a simple and effective means of preparing anhydrous aluminum chloride and magnesium chloride.

Briefly, these objects and other objects of the present invention as hereinafter will become more readily apparent can be attained by a method for dehydrating hydrated metal salt compounds to their anhydrous state by dissolving the metal salt hydrate in an organic solvent; and contacting the solvent solution of metal salt hydrate with a molecular sieve of a pore size sufficient to permit the absorption of water molecules but of a size too small to absorb solvent molecules.

DETAILED DESCRIPTION OF THE PREFERRED EMBODIMENTS

The discovery of the present invention is that under certain conditions, some crystalline aluminosilicates, also known as molecular sieves, absorb the water of hydration from hydrated metal salts in solution. More specifically, it has been found that when organic solvent solutions of hydrated metal salts are contacted with molecular sieves of a pore size sufficient for water molecules to penetrate the sieves, but of a pore size too small for the solvent molecules to penetrate the sieves, the hydrate water molecules are selectively absorbed by the molecular sieve, thereby generating an anhydrous metal salt in an organic solvent solution. The only essential requirement of the solvent is that it must be able to dissolve the hydrated metal salt. Preferred solvents include the low molecular weight $C_1$-$C_6$ aliphatic alcohols, such as methyl alcohol, ethyl alcohol, propyl alcohol, and the like. Other solvents include aldehydes and ketones. The amount of solvent used is not critical since it is only used in amounts sufficient to dissolve the hydrated metal salt. However, usually the concentration of the hydrate in the solvent ranges from 0.01 molar to 0.2 molar, preferably 0.04 molar to 0.07 molar.

Many types of hydrated metal salts can be dehydrated by the process of the present invention. Thus, for instance, suitable hydrate salts which can be dehydrated include the halide, i.e. chloride, bromide, fluoride, iodide, and the like, sulfate, phosphate, and the like salts of the transition metals, the rare earth metals, the actinide metals, the alkali metals and alkaline earth metals. Especially preferred metal salts are the hydrates of aluminum trichloride, magnesium dichloride, ferric chloride, and the like.

An especially important feature of the present process is that it can be used to dehydrate salts which are normally difficult to dehydrate or are sensitive to dehydration. Thus, for example, the anhydrous chloride salts of a number of metals cannot be obtained by simply heating the hydrated forms of the salts to volatilize the water of hydration since such decomposition products as the oxides, oxychlorides, and the like, are formed. Typical salts which react in this manner include $AlCl_3.6H_2O$, $FeCl_3.6H_2O$, $RECl_3.XH_2O$, wherein RE defines any rare earth element.

In the method of the present invention, the organic solvent solution of the hydrated metal salt is simply contacted with a molecular sieve of sufficient pore size to only absorb water molecules and not solvent molecules. In general terms, molecular sieves having a pore size opening of three to five angstroms are satisfactory for the purposes of the present invention with an optimum pore size about 3 A. If necessary, the molecular sieve can be activated prior to use by heating the sieve to evolve any water trapped within the sieve. Normally a temperature of at least 100° C. is employed although the sieves can be heated at lower temperatures under partial vacuum conditions to evolve water. It also follows from this statement that molecular sieve material which has already been used in a dehydration process can also be reactivated for use by heating the used sieves to a temperature sufficient to evolve water.

The time span of the contact between the molecular sieve and metal salt hydrate solution is not critical, since the only determining factor is that sufficient time be given to absorb all of the water hydrate molecules. Normally, a time of 3 hours to 72 hours is sufficient to accomplish dehydration of the salt. Moreover, the quantity of molecular sieve used relative to the amount of hydrated metal salt in solution is not critical. It is only important that a sufficient amount of sieves be present to absorb all the water molecules released by the hydrate. The amount of sieve used will be determined by its own capacity to absorb water and the extent of hydration of the metal salt. Of course, the molecular sieve can be present in excessive amounts relative to hydrated metal salt. The temperature at which the metal salt hydrate solution contacts the molecular sieves is not critical and normally ranges from ambient temperatures to the boiling point of the solvent.

Separation of the organic solvent solution containing anhydrous metal salt compound is easy since the solution need only be filtered from the sieves. The anhydrous metal salt can then be isolated from the solvent by any well known technique such as solvent evaporation or distillation. Of course, it will be readily recognized that for some purposes it may be necessary or convenient not to separate the anhydrous metal salt, but merely use the salt in solution form.

The process of the present invention has been described in terms of a batch process in which a given volume of salt solution is allowed to come in contact with a given amount of molecular sieves for a period of time. However, the skilled artisan will readily realize that the dehydration process can be conducted by other techniques such as continuously flowing the metal salt solution over a bed of sieves.

Generally, anhydrous metal chlorides can be prepared by reacting a metal oxide with chlorine in the presence of a reducing agent such as carbon. The disadvantages of such a process as described in the prior art section of the application are that high temperatures are required as well as an expensive reagent, i.e. chlorine. In an alternative method, a hydrated metal chloride can be converted to the anhydrous state by heating the hydrate in a hydrogen chloride atmosphere in the absence of air or oxygen. However, this technique also has the disadvantage of using high temperatures and an expensive reagent, i.e. HCl. While the reaction of chlorine gas with molten aluminum may be acceptable for producing small amounts of anhydrous aluminum chloride for catalyst purposes, this technique is unacceptable for preparing anhydrous aluminum chloride for use in the electrowinning of large amounts of aluminum by electrolysis in fused salt baths. The same comments hold true for the electrolysis of magnesium salts for the recovery of magnesium metal. It, therefore, can be appreciated that the present process provides a potentially cheaper and simpler route for the preparation of large amounts of anhydrous metal salts used in the electrolytic preparation of certain metals.

Having generally described this invention, a further understanding can be obtained by reference to certain specific examples which are provided herein for purpose of illustration only and are not intended to be limiting unless otherwise specified.

In the following experiments, the dehydration reaction was determined by the Karl Fischer method in which the organic solvent solution was titrated with Karl Fischer reagent to determine the amount of water attached to the metal salt. The metal salt was considered to be dehydrated when the water content was determined to be less than 0.1 mole of $H_2O$ per mole of metal salt.

EXAMPLE 1

A 2.79g amount of hydrated $ZnCl_2$ was dissolved in 250 ml of ethanol and titration of the alcohol solution gave a water content of 0.046M and a $ZnCl_2$ content of 0.076M thus indicating a hydrate composition of $ZnCl_2.\frac{1}{2} H_2O$. Fifty ml of the solution were contacted with 10g of a commercial molecular sieve which is a type A synthetic zeolite having an effective pore size of 3 A which was activated by heating at 250° C. After 3 hours, titration of the solution indicated a metal salt composition of $ZnCl_2.1/7 H_2O$. After 22 hours titration showed anhydrous $ZnCl_2$.

EXAMPLE 2

A 1.53g sample of hydrated $MnCl_2$ was dissolved in 150 ml of ethanol. Titration of a 5 ml sample of the solution gave a $H_2O$ content of 0.151M and a $MnCl_2$ content of 0.060M, giving an overall composition of $MnCl_2.2\frac{1}{2} H_2O$. Fifty milliliters of solution was contacted with 10 g molecular sieve as described in Example 1. After 2 hours contact, the sample had the composition $MnCl_2.\frac{1}{2} H_2O$. After 24 hours contact, the sample contained 0.12 mole $H_2O$ per mole $MnCl_2$.

EXAMPLE 3

A 2.18g amount of hydrated $PrCl_3$ was dissolved in 150 ml of ethanol. Titration of a 5 ml sample of the solution gave an $H_2O$ content of 0.25M and a $PrCl_3$ content of 0.041M, giving an overall composition of $PrCl_3.6H_2O$. Fifty milliliters of solution was contacted with 10 g molecular sieve as described in Example 1. After 3 hours contact, the composition was $PrCl_3.2/3 H_2O$. After 22 hours contact, the composition was $PrCl_3.1/3 H_2O$. The solution was contacted with 10 g of additional molecular sieve. After 1 hour contact, the composition was $PrCl_3.1/5 H_2O$. After 72 hours contact, the composition contained 0.07 mole $H_2O$ per mole $PrCl_3$.

EXAMPLE 4

A 2.37g amount of hydrated $AlCl_3$ was dissolved in 200 ml of ethanol. Titration of a 5 ml sample of the solution gave an H$_2$O content of 0.274M and an AlCl$_3$ content of 0.052M, giving an overall composition of AlCl$_3$.5 1/3 H$_2$O. Fifty milliliters of solution was contacted with 10 g molecular sieve as described in Example 1. After 3 hours contact, the composition was AlCl$_3$.2H$_2$O. After 22 hours contact the composition was AlCl$_3$.½ H$_2$O. The solution was contacted with 10 g additional molecular sieve. After 1 hour contact the composition was AlCl$_3$.1/3 H$_2$O. After 72 hours contact, the sample contained 0.07 mole H$_2$O per mole AlCl$_3$.

EXAMPLE 5

A 2.52 g amount of hydrated MgCl$_2$ was dissolved in 200 ml of ethanol. Titration of a 5 ml sample of the solution gave an H$_2$O content of 0.361M and a MgCl$_2$ content of 0.064M in MgCl$_2$, giving an overall composition of MgCl$_2$.5½ H$_2$O. Fifty milliliters of solution were contacted with 10 g molecular sieve as described in Example 1. After 3 hours contact, the composition was MgCl$_2$.1½ H$_2$O. After 22 hours contact, the composition was MgCl$_2$.½ H$_2$O. The solution was contacted with 10 g additional molecular sieve. After 1 hour contact, the composition was MgCl$_2$.1/6 H$_2$O. After 72 hours contact, the sample contained 0.11 mole H$_2$O per mole MgCl$_2$.

EXAMPLE 6

A 2.14 g amount of hydrated FeCl$_3$ was dissolved in 200 ml of ethanol. Titration of a 5 ml sample of the solution gave a H$_2$O content of 0.228 M and a FeCl$_3$ content of 0.041 M, giving an overall composition of FeCl$_3$.5½H$_2$O. Fifty milliliters of solution was contacted with 10 g molecular sieve as described in example 1. After 3 hours contact the composition was FeCl$_3$.2/3-H$_2$O. After 22 hours contact the sample contained no H$_2$O.

Having now fully described this invention, it will be apparent to one of ordinary skill in the art that many changes and modifications can be made thereto without departing from the spirit or scope of the invention as set forth herein.

What is claimed as new and intended to be secured by Letters Patent is:

1. A method for dehydrating a hydrated metal salt, from the group consisting of ZnCl$_2$, MnCl$_2$, PrCl$_3$ AlCl$_3$, MgCl$_2$ and FeCl$_3$, comprising:

dissolving said hydrated metal salt in an organic solvent consisting essentially of a lower aliphatic alcohol, contacting the resulting solution with a crystalline aluminosilicate molecular sieve having a pore size of about 3 to 5 angstroms, sufficient to permit absorption of water molecules but not solvent molecules, at ambient temperature and for a time sufficient to permit substantially complete absorption of water from the hydrated metal salt, and separating the resulting organic solvent solution of substantially anhydrous metal salt from the molecular sieve.

* * * * *